(12) United States Patent
Chu

(10) Patent No.: US 10,090,624 B1
(45) Date of Patent: Oct. 2, 2018

(54) BOTTOM HOLE ASSEMBLY TOOL BUS SYSTEM

(71) Applicant: Jianying Chu, Houston, TX (US)

(72) Inventor: Jianying Chu, Houston, TX (US)

( * ) Notice: Subject to any disclaimer, the term of this patent is extended or adjusted under 35 U.S.C. 154(b) by 0 days.

(21) Appl. No.: 15/861,380

(22) Filed: Jan. 3, 2018

(51) Int. Cl.
| | | |
|---|---|---|
| E21B 17/02 | (2006.01) | |
| H01R 13/66 | (2006.01) | |
| H02G 9/06 | (2006.01) | |
| H01R 101/00 | (2006.01) | |

(52) U.S. Cl.
CPC ....... *H01R 13/6633* (2013.01); *E21B 17/028* (2013.01); *H02G 9/06* (2013.01); *H01R 2101/00* (2013.01)

(58) Field of Classification Search
CPC .............................. E21B 17/023; E21B 17/028
See application file for complete search history.

(56) References Cited

U.S. PATENT DOCUMENTS

| | | | |
|---|---|---|---|
| 2,178,931 | A | 11/1939 | Crites et al. |
| 2,301,783 | A | 11/1942 | Lee |
| 2,531,120 | A | 11/1950 | Feaster |
| 3,170,137 | A | 2/1965 | Brandt |
| 3,253,245 | A | 5/1966 | Brandt |
| 3,696,332 | A | 10/1972 | Dickson, Jr. et al. |
| 3,879,097 | A | 4/1975 | Oertle |
| 4,914,433 | A | 4/1990 | Galle |
| 5,251,708 | A | 10/1993 | Perry et al. |
| 6,657,551 | B2 | 12/2003 | Huckaba et al. |
| 6,670,880 | B1 | 12/2003 | Hall et al. |
| 6,929,493 | B2 | 8/2005 | Hall et al. |
| 6,968,611 | B2 | 11/2005 | Hall et al. |
| 7,190,280 | B2 | 3/2007 | Hall et al. |
| 7,193,525 | B2 | 3/2007 | Miyamae et al. |
| 7,230,541 | B2 | 6/2007 | Ripolone et al. |
| 7,248,177 | B2 | 7/2007 | Hall et al. |
| 7,319,410 | B2 | 1/2008 | Hall et al. |
| 7,404,725 | B2 | 7/2008 | Hall et al. |
| 7,462,051 | B2 | 12/2008 | Hall et al. |
| 7,504,963 | B2 | 3/2009 | Hall et al. |
| 7,866,404 | B2 | 1/2011 | Rodney |
| 8,109,329 | B2 | 2/2012 | Bray et al. |
| 8,130,118 | B2 | 3/2012 | Hall et al. |
| 8,134,476 | B2 | 3/2012 | Chemali et al. |
| 8,344,905 | B2 | 1/2013 | Madhavan et al. |

(Continued)

*Primary Examiner* — Fritz M Fleming
(74) *Attorney, Agent, or Firm* — Meunier Carlin & Curfman LLC

(57) ABSTRACT

A tool bus spans multiple segments of a bottom hole assembly (BHA) is implemented as a transmission line with only a single electrical contact (SEC) across joints of adjacent segments. A common mode (CM) choke on the transmission line promotes return currents to pass through the transmission line as opposed to through parallel return paths and stabilizes the characteristic impedance on the transmission line. The tool bus uses a two-layer bus with a first layer that is used to communicate across segments and a second layer that is used to communicated among nodes within one segment. A primary node is used to link the primary bus and the secondary bus. A CM choke may be used at the connection between the primary node and the primary bus, at the connection between the primary node and the secondary bus, and/or at the connection between the secondary bus and a secondary node.

23 Claims, 4 Drawing Sheets

(56) References Cited

U.S. PATENT DOCUMENTS

| | | | |
|---|---|---|---|
| 8,371,396 B2 | 2/2013 | Braden et al. | |
| 8,453,739 B2 * | 6/2013 | Parsche | E21B 43/2401 166/302 |
| 8,519,865 B2 | 8/2013 | Hall et al. | |
| 8,704,677 B2 | 4/2014 | Prammer | |
| 8,844,654 B2 | 9/2014 | Boulet | |
| 9,416,655 B2 | 8/2016 | Partouche et al. | |
| 9,466,916 B2 | 10/2016 | Li et al. | |
| 2004/0164833 A1 | 8/2004 | Hall et al. | |
| 2006/0181364 A1 * | 8/2006 | Hall | E21B 17/028 333/24 R |
| 2012/0268288 A1 | 10/2012 | Cousin et al. | |
| 2014/0218206 A1 | 8/2014 | Tjhang et al. | |
| 2015/0070185 A1 | 3/2015 | Schulz et al. | |

\* cited by examiner

BOTTOM HOLE ASSEMBLY TOOL BUS SYSTEM

BACKGROUND

Electronics are playing ever-increasing roles in downhole applications such as testing, measurement, control, actuation, communication, etc. A tool is a functional unit which may include electronics, sensors and other components to execute particular function(s). A bottom hole assembly (BHA) is a group of segments (usually in tubular or cylindrical form) connected end-to-end, and has a collection of tools installed inside the segments. In a BHA, a segment, usually made of a metal or alloy, is a structural unit and is used to protected sensitive electronics or sensor against harsh downhole conditions. A segment may include part of a tool, only one tool, or multiple tools. A tool may be divided among multiple segments which are adjacent or interleaved with other segments. A tool bus physically includes a number of continuous electrical links and is used to interconnect the tools together in order to exchange information and share electrical power internally or externally to the surface. A node is a tool access point which is electrically coupled to the tool bus. A tool may have one node, multiple nodes or share one node with other tools. Electrical links usually made up of wires, components and connectors, etc. pass through the segments and extend across their joints all the away along the BHA in either a direct-contact or a contactless manner to create the physical communication channels for the tool bus.

In the drilling process, BHA tools work together closely to ensure fast penetration, superior borehole quality and precise wellbore placement while maintaining the integrity of the drillstring. A variety of measurements may be continuously taken while drilling, which include natural gamma ray, electrical signals, acoustic signals, stimulated radioactive response, electromagnetic signals, nuclear magnetic resonance, pressure and other properties of the rocks and their contained fluids, etc. Various electronics and sensors are installed in sealed chambers distributed axially in the segments of the BHA, and are further divided by functionality and grouped together as different tools.

These tools are electrically connected to one common tool bus. Normally, one tool is elected as the bus master to manage the bus access, to control or coordinate the BHA operation, and to communicate with the surface through one telemetry tool. As the result, a multipoint bus with a single master and multiple slaves is created. Therefore, information can be exchanged within BHA tools or with the surface under the control of the bus master. Electrical power, usually DC power from a battery or a turbine generator is shared among the tools.

Typically, a BHA communicates with the surface through a mud pulse or electromagnetic (EM) telemetry tool which have a very low speed of a few bits per second, so only a small amount of critical data is communicated real-time while most of downhole data is stored in tool memory. Once the BHA is brought back to the surface, the stored data is traditionally retrieved and processed by powerful surface computers. Until then, in-depth understanding of formations and comprehensive knowledge of trapped fluids cannot be developed.

SUMMARY

According to various aspects of the disclosure a tool bus system for a bottom hole assembly comprises a segment of the bottom hole assembly. The segment of the bottom hole assembly comprises a joint, wherein a single electrical contact (SEC) is provided at the joint and is configured to convey a bus signal across the joint to an adjacent segment of the bottom hole assembly. The tool bus system also comprises a transmission line with at least two conductors. A first conductor of the transmission line is connected to the SEC and is configured to relay the bus signal. A second conductor of the transmission line is connected to a body of the segment at a first location at the joint and is configured as a bus return. The tool bus system also comprises a common mode choke on the transmission line configured to constrain bus return currents to the transmission line.

In some aspects of the disclosure the tool bus system also comprises a communication component of the tool bus system connected to the transmission line and configured to send or receive the bus signal, wherein the common mode choke is between the communication component and the joint.

In any of the above aspects of the disclosure, the tool bus system also comprises a terminator coupled to the transmission line.

In any of the above aspects of the disclosure, the segment comprises a second joint, wherein a second SEC is provided at the second joint and configured to convey the bus signal across the second joint to a second adjacent segment of the bottom hole assembly. The first conductor of the transmission line is connected to the second SEC and the second conductor of the transmission line is connected to the body of the segment at a second location at the second joint.

In any of the above aspects of the disclosure, the transmission line has a constant characteristic impedance at a frequency range of interest.

In any of the above aspects of the disclosure, the common mode choke is implemented as at least one of a ferrite tube through which the transmission line passes, a ferrite bead on the transmission line, one or more coils of wires on a ferrite core, a bifilar wire wrapped around a magnetic core, or the transmission line passing through or wrapped around a magnetic core.

In any of the above aspects of the disclosure, a third conductor of the transmission line is only connected on one end of the third conductor to the body of the segment.

In any of the above aspects of the disclosure, the transmission line is a coaxial cable, twisted wire pair, ladder line, twinax, triax, shielded twisted wire pair, or a multi-axial cable.

In some aspects of the disclosure with the communication component, the transmission line is a primary bus and the communications component is a primary node. The primary node includes a first access port connected to the primary bus and a second access port connected to a secondary bus of the tool bus system.

In any of the aspects of the disclosure where the communication component is a primary node, both ends of the secondary bus are terminated within the segment.

In any of the aspects of the disclosure where the communication component is a primary node, the tool bus system further comprises a secondary node connected to the secondary bus, wherein the secondary node is configured to communicate information and share electrical power with a tool of the bottom hole assembly in the segment.

In some aspects of the disclosure where the secondary node is connected to the secondary bus, the secondary node comprises local circuitry, where a ground of the local circuitry of the secondary node is connected to the body of the segment at a third location.

In any of the aspects of the disclosure where the communication component is a primary node, the primary bus and the secondary bus communicate at different speeds.

In any of the aspects of the disclosure where the communication component is a primary node, the common mode choke is on a leg of the transmission line between the joint and the first access port.

In some aspects of the disclosure where the common mode choke is on the leg, the tool bus system further comprises a second common mode choke on a second leg of the transmission line between a third access port of the primary node and a second joint of the segment.

In any of the aspects of the disclosure where the communication component is a primary node, the common mode choke is integrated within the primary node.

In any of the aspects of the disclosure where the communication component is a primary node, the primary node comprises local circuitry, where a ground of the local circuitry of the primary node is connected to the body of the segment at a fourth location.

In some aspects of the disclosure where the primary node comprises local circuitry, the ground of the local circuitry of the primary node is connected to a conductor of the primary bus configured as a primary bus return and is isolated from a conductor of the secondary bus configured as a secondary bus return.

In some aspects of the disclosure where the primary node comprises local circuitry, the ground of the local circuitry of the primary node is connected to a conductor of the primary bus configured as a primary bus return and is connected to a conductor of the secondary bus configured as a secondary bus return.

In any of the aspects of the disclosure where the tool bus system comprises the secondary node, the tool bus system further comprises a third common mode choke at the connection between the second access port and the secondary bus of the tool bus system.

In any of the aspects of the disclosure where the tool bus system comprises a third common mode choke, the tool bus system further comprises a fourth common mode choke at the connection between the secondary node and the secondary bus of the tool bus system.

In any of the aspects of the disclosure where the communication component is a primary node, the secondary bus comprises a single transmission line that transmits both secondary bus signal and secondary bus power.

In any of the aspects of the disclosure where the communication component is a primary node, the secondary bus comprises two transmission channels that transmits secondary bus signal and secondary bus power separately.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
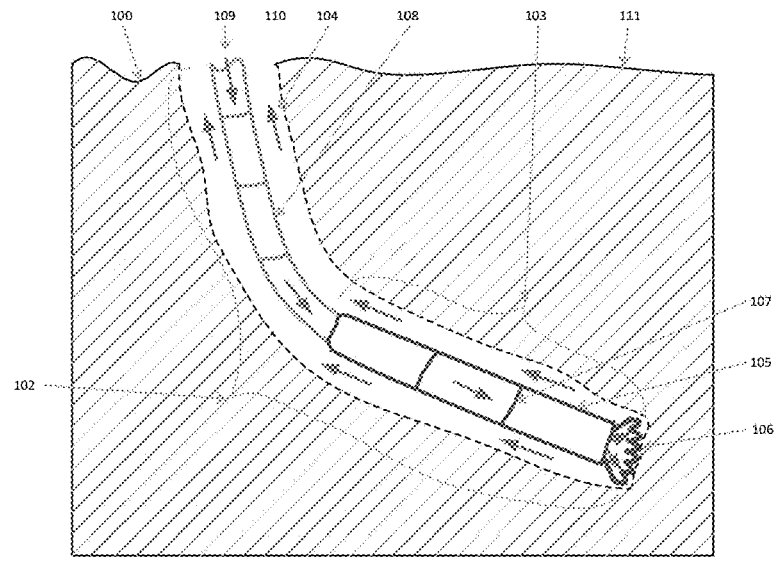
FIG. 1 illustrates an exemplary schematic diagram of a partial drillstring with a bottom hole assembly (BHA) in a wellbore suitable for implementing the several embodiments of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents. Use of the phrase "and/or" indicates that any one or any combination of a list of options can be used. For example, "A, B, and/or C" means "A", or "B", or "C", or "A and B", or "A and C", or "A and B and C".

The pending application discloses a high-performance tool bus system for use inside a bottom hole assembly (BHA) in downhole drilling applications. The disclosed tool bus system not only provides very high communication speeds an order of magnitude greater than conventional tool bus systems, but also remarkably improves to BHA tool performance by lowering the BHA noise floor. The BHA includes a collection of tools and can be conveyed downhole by a drillstring. The BHA is made up of segments (collars or drilling subs) connected end-to-end with a tool bus therein. The tool bus transmits data and/or power among the collection of tools in the BHA. However, it should be understood that disclosed methods and techniques may also be used in other types of downhole BHA, like wireline BHA, slickline BHA, coiled tubing BHA, etc.

Electrical connections across the joints of adjacent segments of the BHA (usually drill collars or subs) are necessary to the tool bus. Numerous multi-contact schemes and even contactless schemes have been attempted over decades. Contactless schemes like inductive coupling, such as described in U.S. Pat. No. 8,130,118 to Hall et al., or acoustic coupling, such as described in U.S. Pat. No. 8,134,476 to Chemali et al., may communicate a signal but are not able to transfer sufficient power across the segment joints, which is up to hundreds of Watts for modern BHAs. On the other hand, multi-contact schemes, such as described in U.S. Pat. No. 7,866,404 to Rodney and U.S. Pat. No. 9,466,916 to Li et al., have excessive complexity and are subject to reliability issues.

Electrical contacts need to be properly insulated from each other, and more contacts will take more space away from the structural material of the joints to make room for the insulators. Given the fixed cross-section area of the joint, radially-arranged contacts will unavoidably reduce available space for body material and lower the joint strength. Schemes that attempt to arrange the contacts in the axial direction in order to minimize the reduction of body material caused new problems. In modern geosteering, the drillstring including the BHA is slightly bent to achieve desired dogleg severity. BHA collars or subs have thick-walled bodies and are very rigid which makes the joints the weakest points. During geosteering, the highest structural strains usually occur at the BHA joints when bent. The strains are not static but dynamic as the drillstring rotates. The periodical strains make tubular connectors subject to material fatigue, seal breakdown, loosen contacts, etc. not to mention the high cost and complicated assembling process that are incurred due to the additional tubular connectors. To achieve the highest joint strength and reliability, simple contact schemes are preferred. Consequently, the prior challenges with alternate electrical contacts underpins the extensive industry application of SEC.

A single electrical contact (SEC) is one dominant industry practice for providing these electrical connections due to reliability concerns and other implementation constraints associated with other electrical connections. There are typically two types of SEC design, the single annular-ring contact, such as described in U.S. Pat. No. 3,879,097 to Oertle, and the single central-pin contact, such as described in U.S. Pat. No. 7,404,725 to Hall et al. A SEC tool bus makes use of the single electrical contacts in the joints of adjacent segments to pass electrical power and data signals across the segments while making use of the segment body as the bus return path. Traditional SEC tool buses, such as disclosed in U.S. Pat. No. 5,251,708 to Perry et al., makes use of the segment body as the bus current return all the way along the BHA. Such SEC tool buses typically have limited communication speed due to lack of impedance control and also result in lower overall BHA performance due to electromagnetic compatibility (EMC) and electromagnetic interference (EMI) issues.

As the physical properties along the current return path are neither constant or uniform, the characteristic impedance of the bus changes with time, location, and signal frequency. Inconstant impedance causes signal reflection and distortion, and thereby limits the achievable signal speed in traditional SEC tool buses. Today, SEC tool buses can typically achieve a maximal bit rate of up to 100 kbps (kilobits per second) in a drillstring BHA which includes up to 8 tubular segments and reaches to 250 feet in length. The number of communication nodes is also limited from 5 to 8. If more nodes are connected, either the communication speed or total BHA length must be compromised. Otherwise, additional signal repeaters must be used, which once again increase the communication latency and reduce the system reliability.

Besides the speed, performance of the BHA tools has also be affected undesirably by traditional SEC tool buses. The electromagnetic (EM) field of the tool bus current is not bound and distributed widely in space. Tool electronics surrounded by the dispersed EM field are unavoidably affected, especially for EMI-susceptible detectors, circuits, and components. Electronic circuits in the tools normally also use the BHA body as their ground reference. The bus current changes the potential distribution of the BHA body when it passes through in accordance to Ohm's Law. Variations in the ground potential create pseudo signals which can couple into the circuits and cause interference. Even worse, some tools, such as a conduction resistivity tool and EM telemetry tool, may directly use the BHA body as part of their signal path. This results in a common ground issue and restricts the overall BHA performance such as signal speed, measurement resolution, and sensitivity, etc. A small amount of bus current passing through the formation can be undiscernibly picked up by modern sophisticated tools, e.g. ranging tool and nuclear magnetic resonance (NMR) tool which have a measurement current that passes through the formation as well.

Historically, the communication payload on the tool bus was light, and available SEC tool bus speeds were adequate. However, the technology advances are changing the situations over past years. New tools have been developed which add more nodes to the tool bus. The number of nodes, bus speed, and BHA length are counteracting factors. Increases in one must compromise the other two unless signal repeaters are used. Nearly all the new tools, such as imaging tools and seismic tools, produce great amounts of data which significantly increase the communication needs.

Powerful new electronics such microprocessors and digital signal processors (DSPs) have been used in the tools, which can execute advanced data processing algorithms previously done only by surface computers so that clear pictures of the subsurface can be captured while drilling rather than having to wait for later surface processing. Modern electronics have reduced the uncertainty and risks associated with drilling operations and have directly bred the modern drilling automation and control. Certainty, high bus speeds are imperative to transfer massive amounts of data to a central processing unit.

Clean BHA EM environments are important for increasingly sophisticated tools. Especially, as tools are usually placed as close to the drill bit as possible in order to quickly and accurately obtain valuable front-of-bit information and an ever-congested BHA is increasing the significance of EMC/EMI design.

Many efforts have been made to increase the bus speed by taking advantage of techniques and methods proven in the modern digital communication field. U.S. Pat. No. 6,657,551 to Huckaba et al. discloses one point-to-point communication system for wireline telemetry between downhole and surface, which is based on the Discrete Multi-tone (DMT) modulation, also known as orthogonal frequency-division multiplexing (OFDM). U.S. Pat. No. 7,230,541 to Ripolone et al. disclosed a SEC tool bus and attempted to use ethernet and VSDL techniques as well as the complicated modulation schemes such as Quadrature Amplitude Modulation (QAM) and DMT modulation. However, these attempts at increasing the communication speed focus on the data link and protocol layer only, but failed to look into the underlying physical layer. Therefore, these attempts resulted in impractical implementations that require sophisticated hardware structure and powerful processing electronics to support. The resulting systems inevitably have low reliability and excessive power consumptions.

The pending application focuses on the physical layer of the tool bus, on which various logical layers can be implemented. Therefore, the tool bus can support different modulation schemes and communication standards. For example, modulation schemes and communication standards suitable for providing reliability in demanding downhole environments may include digital baseband modulation schemes such as Manchester coding, alternative mark inversion (AMI), Miller coding, etc. or simple passband modulation schemes such as frequency-shift keying (FSK), binary FSK (BFSK), amplitude-shift keying (ASK), on-off keying (OOK), etc.

The tool bus of the pending application is implemented with a transmission line. A transmission line comprises at least two conductors that have a constant characteristic impedance all the way along the communication channel at the frequency range of interest. One conductor of the transmission line is used to pass the signal and power, while the other conductor(s) are used for the bus current return as opposed to using the BHA body for bus current return. However, there is only a single electrical contact (SEC) across joints of adjacent segments, and the bus return conductor(s) must be connected to the segment body at least at the segment joints to achieve electrical continuity. The segment body is electrically in parallel to the bus return conductor(s) of the transmission line. Also, another latent current return path includes the mud flow and nearby formations that is created when the BHA is deployed downhole. These parasitic current return paths have been neglected in the past unintentionally or intentionally with the assumption that the parasitic path has low conductivity. However, when electronic sensitivity or measurement range approach the micro volt level as today downhole tools, even small bypass current can substantially jeopardize the tool performance. Moreover, the two undesirable current return paths also affect the channel impedance and limit the achievable communication speed. The pending application makes use of common mode (CM) choke (CK for short) on the transmission line to promote return currents to pass through the transmission line and prevents return currents from passing through the parallel return paths, resulting in a clean BHA EM environment. The CM choke also stabilizes the communication channel impedance which facilitates higher communication speeds.

Additionally, the tool bus of the pending application may use a multi-layer bus architecture, preferably a two-layer bus. The first layer of the bus architecture includes a primary bus that is used to communicate across segment joints and operates at a first bus speed. The second layer of the bus architecture includes a secondary bus that is used to communicated among multiple nodes within one segment of the BHA and operates at a second bus speed, that may be higher than the first bus speed. A primary node is used to link the primary bus and the secondary bus for data and power transmission. The layered bus architecture minimizes the loading effect on the primary bus by only having preferably one or a fewest possible primary nodes connected to the primary bus on each segment of the BHA so that the highest communication speed can be achieved. In some implementations, the first bus speed is approximately 1 megabit per second (Mbps) while the second bus speed is approximately 10 Mbps. Additionally, the layered bus architecture allows for an increased number of nodes in each segment of the BHA. In some implementations, the BHA may have as many as 16 nodes (1 primary node and 15 secondary nodes) per segment for a BHA with up to 8 segments and 250 feet in length.

FIG. 1 illustrates an exemplary simplified schematic diagram of a partial drillstring 102 with a bottom hole assembly (BHA) in a wellbore suitable for implementing the several embodiments of the disclosure. The drillstring 102 is used to penetrate a formation 100 and create a borehole connecting a targeted reservoir to the surface 111. The drillstring 102 is made up of an assembly of serially-connected drill pipes 108 at its upper section and a BHA 103 at its lower section. The BHA 103 may alternatively be referred to as a downhole BHA 103. The BHA 103 includes several segments 105 of drill collars or functional drill subs connected end-to-end with rotatory shouldered joints 107, and a drill bit 106 disposed at its lower distal end. Other types of joints may be used. Functional tools (not shown) like stabilizers, reamers, logging-while-drilling (LWD) tools, measurement-while-drilling (MWD) tools, turbine generators, telemetry tools, and geosteering tools may be attached to or enclosed by the BHA segments 105. The drillstring 102 has an inner bore 109 to circulate drill mud 104 from the surface 111 down to nozzles (not shown) on the drill bit 106, then circulate up through the annulus 110 between the drillstring and the borehole, and finally back to a mud pit (not shown) on the surface 111.

Figure 2:
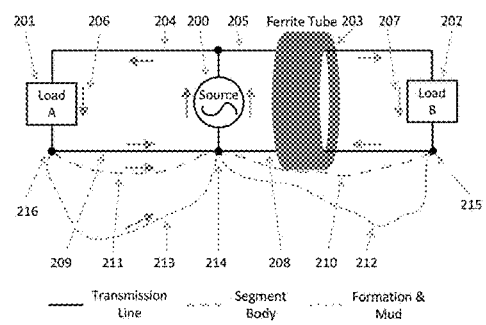
FIG. 2 illustrates an exemplary schematic diagram of different current flows through a two-conductor transmission line used in the BHA suitable for implementing the several embodiments of the disclosure.

FIG. 2 illustrates an exemplary schematic diagram of different current flows through a two-conductor transmission line used in the BHA 103 suitable for implementing the several embodiments of the disclosure. The two-conductor transmission line may be, for example, a coaxial cable, ladder line, twisted wire pairs, or any other types of two-conductor transmission line. Multi-conductor transmission lines with three or more conductors may also be used herein.

The importance of impedance matching for high-speed signal communications has been well recognized so that today, two- or multi-conductor transmission lines have been preferred to single wire connections in the communication field. Some implementations of downhole transmission systems have electrically connected an outer shield conductor of a cable to a pipe body with the expectation that the cable would automatically assume its specified characteristic impedance. However, the characteristic impedance of a transmission line can also be changed by how it is used, sometimes the changes can be significant.

As shown in FIG. 2, an AC source 200 is connected to a Load A 201 by a first transmission line that includes a first conductor 204 and the second conductor 209. The AC source 200 is also connected to a Load B 202 by a second transmission line that includes a third conductor 205 and a fourth conductor 208. The third and fourth conductors 205, 208 of the second transmission line also passes through a tubular ferrite core 203. The second conductor 209 and the fourth conductor 208 of the first and second transmission lines are tied to a body of one of the BHA segments 105 at points 214, 215, and 216 as shown in FIG. 2.

Because the body of the segment is made of a conductive metal, the segment creates a first current return path 210 in parallel with the fourth conductor 208 of the second transmission line. Similarly, the body of the segment creates a second current return path 211 in parallel to the second conductor 209. As shown in FIG. 1, the BHA 103 is also in direct contact with the drill mud 104 and the formation 100 when the BHA 103 is lowered in borehole. Because the drill mud 104 and the formation 100 are also slightly conductive, they will create a third current return path 212 in parallel with the fourth conductor 208 of the second transmission line as well as the first current return path 210. Similarly, the drill mud 104 and the formation 100 create a fourth current return path 213 in parallel with the second conductor 209 of the first transmission line as well as the second current return path 211. Therefore, for Load A 201, there are three parallel electrical return paths—the second conductor 209, the second current return path 211 provided by the body of the segment, and the fourth current return path 213 provided by the drill mud 104 and the formation 100. Similarly, for Load B 202, there are three electrical return paths—the fourth conductor 208, the first current return path 210 provided by the body of the segment, and the third current return path 212 provided by the drill mud 104 and the formation 100.

A return current 206 from the Load A 201 can freely flow through any of the three paths 209, 211, 213 in accordance to Ohm's Law, which changes the effective impedance of the first transmission line. Although the skin effect tends to make the return current favor the return path provided by the second conductor 209, the skin effect becomes effective only when the signal frequency is very high, typically a few hundred kilohertz. In downhole applications, most electrical signals of interest are lower than one hundred kilohertz, especially for measurement and sensing signals detected by tools of the BHA 103. In addition to changing the effective impedance of the first transmission line, the bus current return through paths 211 and 213 also generates dispersed energy filed which can induce EM noise in the downhole tools.

In contrast, a return current 207 from the Load B 202 is constrained to exclusively flows through the fourth conductor 208 due to the ferrite tube 203. Functionally, passing the third conductor 205 and the fourth conductor 208 of the second transmission line through the ferrite tube 203 acts as a CM choke, which makes the first and third current return paths 210, 212 detrimental to the return current 207. Accordingly, the CM choke stabilizes the effective impedance of the second transmission line. Different from the skin effect, CM chokes have a much wider effective frequency range, especially at the low frequency end, such as below one hundred kilohertz. In practice, CM chokes can be tailored for the frequency range of interest.

DC components of the return current 207 and frequencies outside of the effective frequency range of the CM choke may still travel along the three parallel return paths 208, 210, 212 of the second transmission line. However, DC or low frequency components cause few problems given that downhole tools tend not to operate in the affected range. The CM choke effectively eliminates the EM noise which would otherwise impair the downhole tool performance. While the CM choke is shown as being implemented with the second transmission line passing through the ferrite tube 203, other implementations of a CM choke may be used, such as a ferrite bead on a coaxial cable, one or more coils of wires on a ferrite core, or any other construction readily understood by those of ordinary skill in the art. Additionally, while described as a CM choke, it is understood that a balun, inductor, transformer, or other equivalent electronic components could be substituted for the CM choke described herein.

Figure 3:
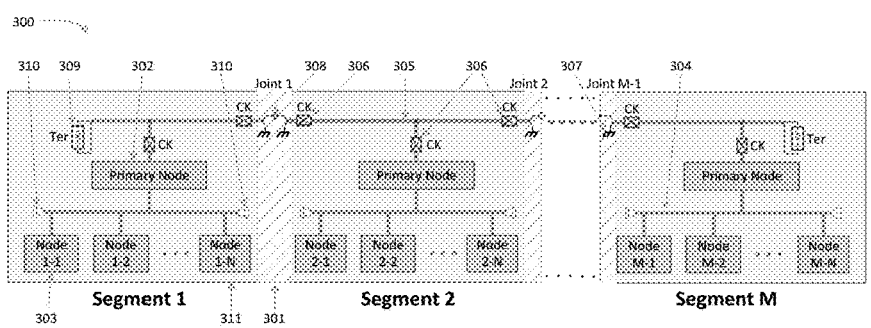
FIG. 3 illustrates an exemplary schematic diagram of a tool bus system with a multi-layer bus architecture for use in the BHA suitable for implementing an embodiment of the disclosure.

FIG. 3 illustrates an exemplary schematic diagram of a tool bus system 300 with a multi-layer bus architecture for use in the BHA 103 suitable for implementing an embodiment of the disclosure. As shown in FIG. 3, the BHA 103 includes M electrically-linked segments 311. The segments 311 are referenced herein individually as a segment 311, referenced as a group of two or more as segments 311, or referenced collectively as a whole as segments 311. The segments 311 correspond to the segments 105 described above. Here, M is an integer number, typically from 2 to 8, and the segments 311 from 3 to M−1 are not shown for simplicity.

Within each segment 311, the tool bus system 300 includes a primary node 302 and N secondary nodes 303. The primary node 302 and secondary nodes 303 are each generally be referred to herein as communication components of the tool bus system 300. That is, a communication component of the tool bus system 300 is a component that communicates bus signal and/or bus power with at least one bus of the tool bus system 300. Here, N is an integer number typically from 0 to 8, though the tool bus system 300 may support up to 16 nodes per segment 311 without communication speed degradation. The secondary nodes 303 from 3 to N−1 are not shown for simplicity. The primary node 302 includes a first access port connected to a primary bus 305. The primary bus 305 extends across M−1 joints 301 via a single electrical contact (SEC) 308 and links all M segments 311 together. The primary node 302 also includes a second access port connected to a secondary bus 304. Each of the secondary nodes 303 has an access port connected to the secondary bus 304. Both the primary node 302 and the secondary nodes 303 can include their specific functional unit which implements a different task for the BHA 103 such as sensing, actuating, controlling, recording, etc.

While each of the segments 311 is shown in FIG. 3 as including only one primary node 302 and multiple secondary nodes 303, it should be understood that one or more of the segments 311 may not include any primary node 302 or secondary node 303 and only relay the bus signal along the primary bus 305. One or more of the segments 311 may have one or more of the primary nodes 302. The total number of primary nodes 302 coupled to the primary bus 302 should not be too high, typically less than 8, so that the loading effect on the primary bus 302 will stay in a proper range so that the bus speed will not be degraded. While each of the segments 311 is shown in FIG. 3 as having the same number of secondary nodes 303 in each of the segments 311, one or more of the segments 311 may have a different number of nodes (e.g., a number other than N).

The primary bus 305 shown in FIG. 3 includes a segmented transmission line. The transmission line includes two or more conductors and has a constant characteristic impedance at a frequency range of interest. The frequency range of interest includes a frequency range at which communication signals are conducted along the transmission line. In some implementations, the frequency range of interest is between 10 kHz and 100 MHz. In some implementations, the primary bus 305 provides an available bandwidth greater than 100 kbps and less than or equal to 100 Mbps, greater than or equal to 500 kbps and less than or equal to 5 Mbps, or greater than or equal to 1 Mbps and less than or equal to 10 Mbps. Some two-conductor transmission lines include a coaxial cable, a twisted wire pair, or a ladder line. Other two-conductor transmission lines may be used. In the two-conductor transmission lines, one conductor is used as the bus signal and the other conductor is used as the bus return for the primary bus 305. Multi-conductor transmission lines (e.g., transmission lines with three or more conductors) include twinax, triax, shielded twisted wire pair, and multi-axial cables. Other multi-conductor transmission lines may be used. In some implementations, a two-conductor coaxial cable transmission line is preferred.

Regardless the type of transmission lines, the bus return of the primary bus 305 is only connected to the body of a given segment 311 at a location 307 at the segment joints 301. For two-conductor transmission lines, the bus signal of the primary bus 305 is connected to the SEC 308 at the segment joints 301 to connect the segments of the segmented transmission line across the segment joints 301. The SEC 308 at the joint 301 for a segment 311 provides an electrical connection with the SEC 308 of a directly adjacent segment 311 when the two segments are connected to each other. The SEC 308 provides electrical continuity of the primary bus 305 across segments 311 of the BHA 103. Because there is only one electrical path provided by the SEC 308, the conductor of the transmission line that carries the bus signal is connected to the SEC 308. When the two-conductor transmission line is a coaxial cable, it is preferred that the inner conductor is connected to the SEC 308 for conveying the bus signal across the segment joints 301. If a multi-conductor transmission line is used, at least one shielding conductor can be used for additional Faraday shielding by connecting only one end of the shielding conductor to the body of the segment 311 at the location 307 at the joint 301. The other end of the shielding conductor is left as an open circuit.

As shown in FIG. 3, the primary bus 305 in each of the segments 311 is shown as a T-shaped bus with three legs. This should be understood in a logical sense rather than in a physical sense. In some implementations, each of the legs can be implemented as a connector or a PCB trace. For intermediary segments 311, a common-mode (CM) choke 306 is used on each leg of the primary bus 305. That is, a CM choke 306 is used at the connection between the primary bus 305 and the first access port of the primary node 302, and at the connections between the primary bus 305 and the SEC 308 at the joints 301.

For terminating segments 311, such as Segment 1 and Segment M shown in FIG. 3, each of the ends of the primary bus 305 are terminated with a terminator 309. However, a CM choke 306 is still used at the connection between the primary bus 305 and the first access port of the primary node 302, and at the connection between the primary bus 305 and the SEC 308 at the joint 301. The terminator 309 has the same impedance as the primary bus 305 and blocks DC currents. In the simplest form, the terminator 309 includes a resistor and a capacitor in series. However, it should be understood that terminator may be optional when the tool bus appears to be lumped rather than to be distributed in particular applications according to well-known transmission line theory. For example, when the bus speed is low in comparative sense to the bus length, the bus system is said to be a lumped system. In the lumped system, a termination may not be used. This is a relative concept, where, for example, a 1 MHz, 1-meter length system can be lumped, while 100 KHz, 100-meter system can be distributive. In distributed systems, termination is used to mitigate signal reflection. In downhole BHA applications, with communication speeds of a few hundred kHz and 250 feet, the bus tends to be distributed. However, if the bus length shortens to 100 feet, for example, it can be a lumped system.

There are 3 and 2 CM chokes 306 used in the intermediary and terminating segments 311, respectively as shown in the FIG. 3. In practice, However, only 2 and 1 CM chokes 306 can be used in the intermediary and terminating segments 311, respectively without loss of the performance if there is at least one CM choke 306 between any two distant grounding locations.

The CM choke 306 can be implemented as a bifilar wire wrapped around a magnetic core with four terminals leading out of the component. The CM choke 306 can also be simply formed with the transmission line passing through or wrapped around a magnetic core. The magnetic core is typically made from soft magnetic materials such as ferromagnetic, ferrite and nanocrystalline magnetics, or the like. In the practice, CM chokes 306 are designed to prevent magnetic core saturation due to unbalanced bus currents.

The secondary bus 304 is segment-dependent and may use different communication schemes among each of the segments 311. Because the secondary bus 304 is fully contained within a given one of the segments 311, there are no constraints on the number of electrical contacts that can be used in the transmission line(s). For example, the secondary bus 304 can use standard multi-conductor bus schemes such as CAN, RS485, LVDS, MIL-STD-1553, or the like. In some secondary bus 304 implementations, the bus signal and bus power are transmitted separately with different conducting pairs. When bus power and bus signal are transmitted together, the secondary bus 304 may use a similar communication scheme as the primary bus 305. However, the secondary bus 304 may operate at a much higher speed due to its shorter bus length. Regardless the communication scheme used, the secondary bus 304 should be terminated with a terminator 310 at both ends of the secondary bus 304 within a given one of the segments 311 if the secondary bus 301 becomes distributed in terms of transmission line model.

Figure 4:
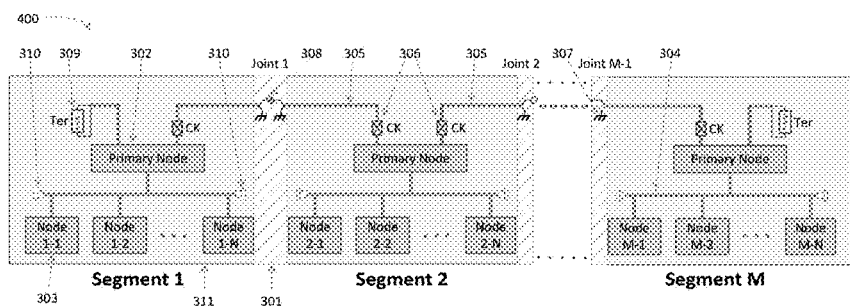
FIG. 4 illustrates an exemplary schematic diagram of a tool bus system with a multi-layer bus architecture for use in the BHA suitable for implementing another embodiment of the disclosure.

FIG. 4 illustrates an exemplary schematic diagram of a tool bus system 400 with a multi-layer bus architecture for use in the BHA 103 suitable for implementing another embodiment of the disclosure. The tool bus system 400 is substantially similar to the tool bus system 300 described above with reference to FIG. 3, and like numerals represent like parts. In the interest of simplicity, the common components shown in the tool bus system 400 are not described again, but should be understood in reference to their disclosure in FIG. 3 above.

As shown in FIG. 4, the primary bus 305 has two legs connected to the primary node 302 in each of the segments 311. That is, the primary node 302 of the tool bus system 400 has a first access port that connects to a first leg of the primary bus 305 in the segment 311, a second access port that connects to a second leg of the primary bus 305 in the segment 311, and a third access port that connects to the secondary bus 304 in the segment 311. For intermediary segments 311, the CM choke 306 is used at each of the first and second legs of the primary bus 305. For terminating segments, a terminating end of the primary bus 305 is connected to the terminator 309 at one of the first or second access ports of the primary node 302, and the CM choke 306 is used at the other of the first or second access ports of the primary node 302.

The tool bus system 400 of FIG. 4 has appreciable implementation advantages, especially when upgrading existing tools to incorporate the tool bus system 400. In some implementations, the CM chokes 306 and terminators 309 can be physically integrated into the primary node 302 to make a single-package design, which can remarkably simplify the installation and eliminate extra machining on the body of the segment 311. Therefore, a simple transmission line (e.g., coaxial cable) connection can extend between the primary node 302 and the SEC 308 at the joints 301. The transmission line in the primary node 302, usually implemented as PCB traces, has the same characteristic impedance as the external transmission lines.

In both tool bus 300 and tool bus 400 described above with reference to FIGS. 3 and 4, the SEC 308 at the joints 301 is designed to achieve the optimal impedance match to the transmission line, which typically includes optimization of contact geometry, insulator design, and joint structure. Additionally, connectors used in the tool buses 300, 400 should also have the same impedance as the transmission lines to which they are connected.

Figure 5:
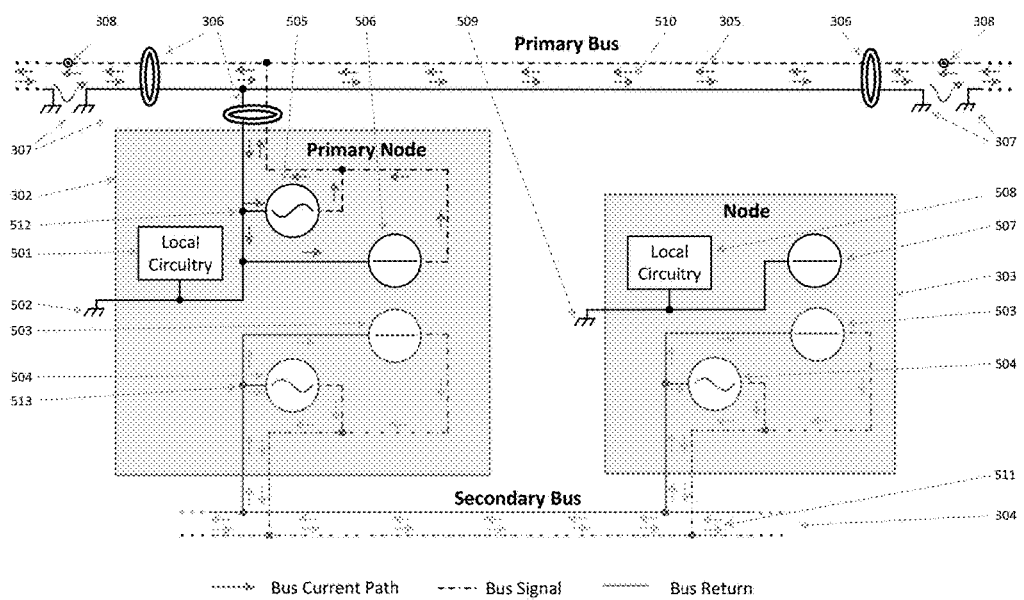
FIG. 5 illustrates an exemplary schematic diagram of current flow in the tool bus systems of FIG. 3 or 4 in a segment of the BHA suitable for implementing an embodiment of the disclosure.

FIG. 5 illustrates an exemplary schematic diagram of current flow in the tool buses 300, of FIG. 3 in a segment 311 of the BHA 103 suitable for implementing an embodiment of the disclosure. For simplicity, only the grounding connections and pertinent signals are shown to illustrate how tool bus currents are prevented from passing through the body of the segment 311. While the schematic diagram of FIG. 5 is illustrated corresponding to the tool bus 300 of FIG. 3, the principles described herein apply equally to the tool bus 400 of FIG. 4.

As discussed above with reference to FIG. 3, the primary node 302 has two access ports, a first access port that connects the primary node 302 to the primary bus 305 and a second access port that connects the primary node 302 to the secondary bus 304. The first access port includes a signal transceiver 505 and a bus power converter 506 connected to the primary bus 305. The second access port includes a signal transceiver 504 and a bus power converter 503 connected to the secondary bus 304. The signal transceivers 504, 505 are each used to transmit and receive the bus signal to or from the connected primary and secondary buses 304, 305, respectively. The bus power converters 503, 506 are each used to sink or source the bus power with the respective connected primary and secondary buses 304, 305, to provide the necessary power conversion for local circuitry needs, and are located next to each other to transmit power to or receive power from the other bus of the buses 304, 305. As shown in FIG. 5, the signal and power are transmitted together in one transmission line. However, it should be understood that the principles and methods disclosed herein can also be applied to where the signal and power are transmitted in two separate signal paths, such as described in more detail below with reference to FIG. 9. The primary node 302 also includes its local circuitry 501 to perform signal processing, encoding/decoding, modulation/demodulation, and other functions. The signal transceivers 504, 505 can communicate with the local circuitry 501.

As electrical circuitry uses a stable ground reference to operate properly and achieve noise immunity, the ground of the local circuitry 501 is connected to the body of the segment 311 at a location 502 where the primary node 302 is installed. As shown in FIG. 5, the ground of the local circuitry 501 is further connected to a primary bus return 512 for a simple primary node implementation, although it may also be connected to a secondary bus return 513, such as described in more detail with reference to FIG. 6, or even isolated from the both bus returns 512, 513 at the cost of high system complexity. As a result, additional return paths through the segment body between locations 307 and 502 are established. The CM chokes 306 (at least two of the three CM chokes 306 can be used to achieve the proper result), however prevent the bus current from passing through these paths as discussed above with reference to FIG. 2. As shown in the figure, the bus current only passes through the segment body near the SEC 308, which however is physically short and may have a similar or the same impedance as the transmission line of the primary bus 305 if the SEC 308 is properly designed. Consequently, the bus current of the primary bus 305 is concentrated and bound within the current path 510 represented by the arrows between the two conductors of the primary bus 305, which is not representing the direction of current. As shown in FIG. 5, the secondary bus return 513 is isolated from the primary bus return 512.

The secondary node 303 includes an access port that connects the secondary node 303 to the secondary bus 304. The access port of the secondary node 303 includes a signal transceiver 504 and a bus power converter 503. The signal transceiver 504 and the bus power converter 503 of the secondary node 303 may be equivalent to the signal transceiver 504 and bus power converter 503 in the primary node 302. In other words, the access port of the secondary node 303 is equivalent to the second access port in the primary node 302. The secondary node 303 also includes local circuitry 508 and a power converter 507 that share a common reference which is connected to the body of the segment 311 at a location 509.

Because the secondary bus return 513 is completely isolated from the body of the segment 311, secondary bus current is entirely bound within the current path 511 represented by the arrows between the two conductors of the secondary bus 304. Therefore, there is a minimal amount of tool bus current passing through the body of the segment 311 only at the joint 301. Two improvements arise from the manipulated bus current paths. First, the characteristic impedance of transmission line of the primary bus 305 and the secondary bus 304 is free from unwanted changes, which in turn facilitates higher signal speed communications. Second, the common ground issue is eliminated, and EM cross-interference is reduced as the amount of current that passes through the body of the BHA 103 and formation 100 is mitigated. Generally, this leads to a lower noise floor and cleaner EM environment for the BHA 103, which in turn improves the SNR of the primary bus 305 and the secondary bus 304 and facilitates even higher signal speed communications.

Figure 6:
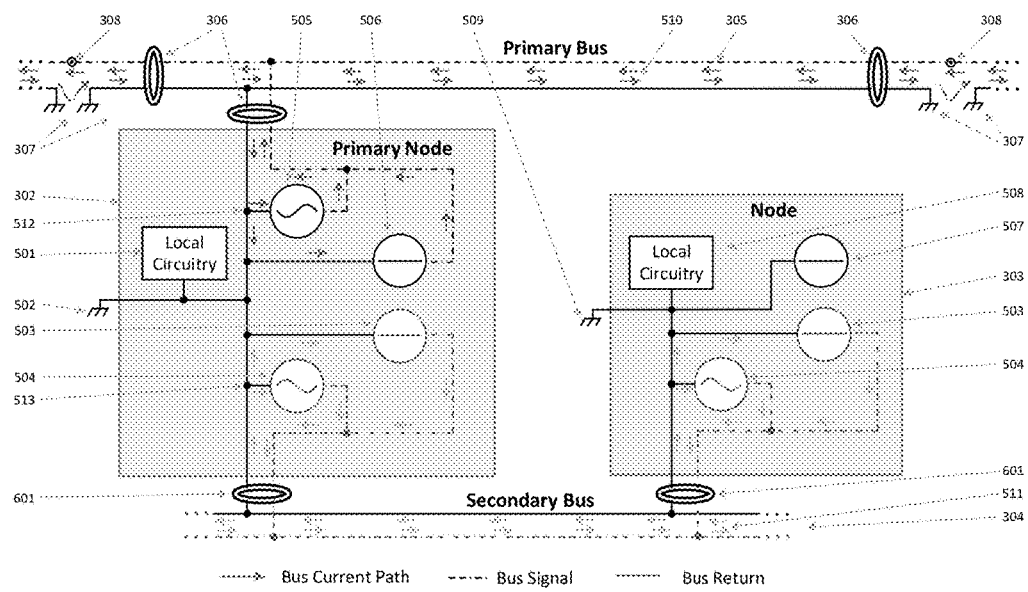
FIG. 6 illustrates an exemplary schematic diagram of current flow in the tool bus systems of FIG. 3 or 4 in a segment of the BHA suitable for implementing another embodiment of the disclosure.

FIG. 6 illustrates an exemplary schematic diagram of current flow in the tool buses 300, 400 of FIG. 3 or 4 in a segment 311 of the BHA 103 suitable for implementing another embodiment of the disclosure. It is not a simple job to create the isolated grounds described above with reference to FIG. 5 as complex electronics and circuits may be needed, which unfortunately have comparatively low reliability in downhole environments. As shown in FIG. 6, a conventional single ground is used due to its ruggedness and simplicity in the primary node 302 and the secondary node 303. As shown, an additional return path through the body of the segment 311 between locations 509 and 502 is established. To limit the bus current from the secondary bus 304 from passing through this path, two CM chokes 601 are used. More generally, a CM choke 601 is used at the connection of each of the access ports to the secondary bus 304. Accordingly, the bus current of the secondary bus 304 will then have a preferred path established through its transmission line. As CM chokes have no effect on DC current, an increase in the DC current through the body of the segment 311 should be expected. However, this causes negligible problems as most downhole signals of interest are AC, rather than DC.

Figure 7:
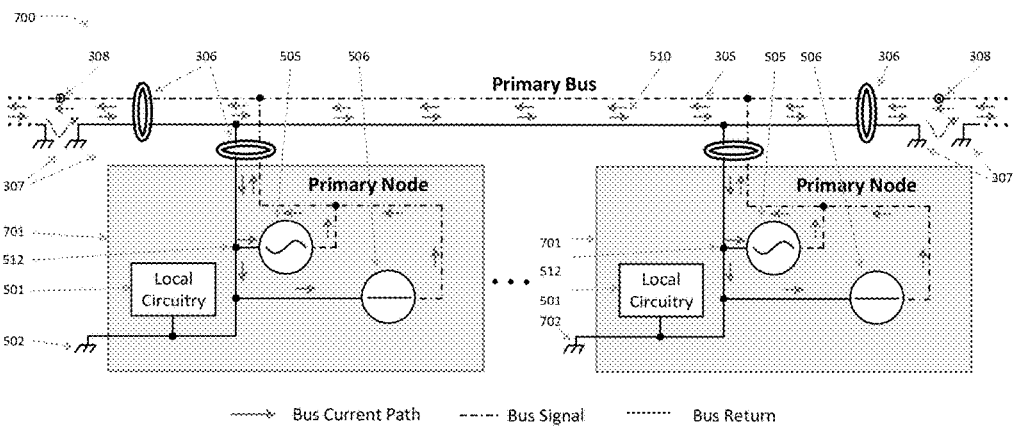
FIG. 7 illustrates an exemplary schematic diagram of current flow in a tool bus system with a single layer bus architecture in a segment of the BHA suitable for implementing another embodiment of the disclosure.

FIG. 7 illustrates an exemplary schematic diagram of current flow in a tool bus system 700 with a single layer bus architecture in a segment 311 of the BHA 103 suitable for implementing another embodiment of the disclosure. The tool bus system 700 is substantially similar to the tool bus systems 300, 400 described above with reference to FIGS. 3 and 4, and like numerals represent like parts. In the interest of simplicity, the common components shown in the tool bus system 700 are not described again, but should be understood in reference to their disclosure in FIG. 3 above. As shown in FIG. 7, the segment 311 does not include the secondary node 303 and instead has multiple primary nodes 701 directly coupled to the primary bus 305. Each of the primary nodes 701 includes only an access port that connects a respective one of the primary nodes 701 to the primary bus 305. The primary node 701 can be derived by removing the second access port of the primary node 302. In another sense, the primary node 701 is also functionally equivalent to the secondary node 303 in the FIGS. 5 and 6. The access port includes a signal transceiver 505 and a bus power converter 506 connected to the primary bus 305. Each of the primary nodes 701 also includes its respective local circuitry 501. As electrical circuitry requires a stable ground reference to operate properly and achieve noise immunity, the ground of the local circuitry 501 in a first of the primary nodes 701 is connected to the body of the segment 311 at a location 502. Each additional primary node 701 has the ground of the local circuitry 501 connected to the body of the segment at a location 702. As a result, additional return paths through the segment body between locations 307, 502, and 702 are established. The CM chokes 306, however prevent the bus current of the primary bus 305 from passing through these paths as discussed above with reference to FIG. 2. Consequently, the bus current of the primary bus 305 is concentrated and bound within the current path 510 represented by the arrows between the two conductors of the primary bus 305. It greatly simplifies the implementation by using a single-layer bus and directly connecting multiple primary nodes 701 to the primary bus 305. However, the total number of primary nodes 701 coupled to the primary bus 305 should be limited, typically less than 8 so that there is no significant performance drops.

Figure 8:
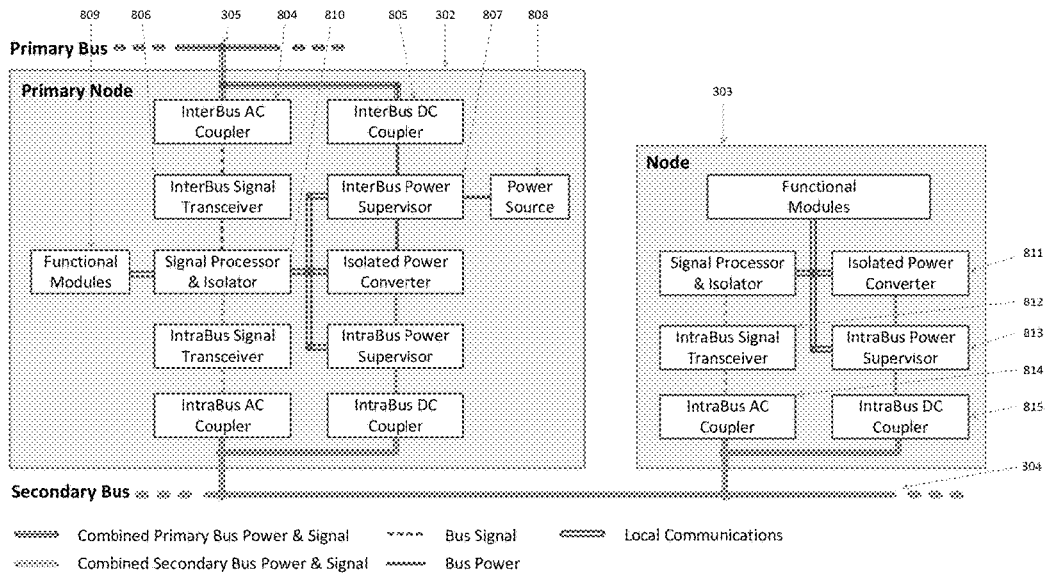
FIG. 8. Illustrates an exemplary schematic diagram of a partial tool bus that shows the main functional blocks of a primary node and a secondary node used in any of the tool buses of FIGS. 3-6 suitable for implementing the several embodiments of the disclosure.

FIG. 8 Illustrates an exemplary schematic diagram of a partial tool bus 300 that shows the main functional blocks of a primary node 302 and a secondary node 303 used in any of the tool buses shown and described in FIGS. 3-6 suitable for implementing the several embodiments of the disclosure. The primary node 302 is connected to the primary bus 305 with a primary bus AC coupler 804 and a primary bus DC coupler 805. The primary node 302 is also connected to the secondary bus 304 with a secondary bus AC coupler 814 and a secondary bus DC coupler 815. The secondary node 303 is connected to the secondary bus 304 with another secondary bus AC coupler 814 and another secondary bus DC coupler 815. As shown in FIG. 8, the secondary node 303 is a light version of the primary node 302. Hence, the following discussions about the primary node 302 are also applicable to the secondary node 303.

A coupler (power signal or data signal) is defined to pass through signals of interest at a minimal insertion loss while blocking other signals at a minimal loading effect, i.e. with a high apparent input impedance to other signals. A coupler differs from a filter in that a filter emphasizes the output characteristics rather than the input characteristics so that a filter may have a low apparent input impedance to other signals. The primary bus AC coupler 804 and the primary bus DC coupler 805 are used to separate AC signals from DC power on the primary bus 305 for the further processing, or to combine AC signals and DC power for transmission on the primary bus 305.

A primary bus signal transceiver 806 is used to modulate the digital data from a signal processor and isolator 810 into a physical signal which can be communicated on the primary bus 305 via the primary bus AC coupler 804. The signal processor and isolator 810 also can decode bus signals received from either of two connected transceivers (primary bus signal transceiver or secondary bus signal transceiver), to process and encode data for the other transceiver. The signal processor and isolator 810 is used to generate two separate grounds within the primary node 302. One primary node ground is connected to the bus return of primary bus 305 and the other primary node ground is connected to the ground bus return of the secondary bus 304. Although the signal processor and isolator 810 are shown as an integral unit, it should be understood that isolation can be implemented by any of the other functional blocks on the AC signal path, e.g., the primary bus or secondary bus AC couplers 804 or the primary bus or secondary bus signal transceivers 806.

The functional modules 809 include all the other functional modules which are not directly related to the bus communication. They may include a memory unit, a downhole tool, an interface to external PC for downhole data retrieval or BHA configuration, etc. In terms of their circuit ground, the functional modules 809 can use either the ground on the primary bus 305 or the ground on the secondary bus 304, or to both grounds simultaneously if proper ground isolation is still maintained.

A primary bus power supervisor 807 is used to generate power rails for electronics referring to the primary bus return 512, to monitor the local power health in the primary node 302, and to interface with a power source 808, as well as other power-pertinent tasks.

The power source 808 can supply the whole BHA 103 or one or a set of the segments 311 of the BHA 103. The power source 808 may be as simple as lithium batteries or an interface to a downhole alternator. Although it is desirable that power source 808 is directly linked to the primary bus 305, it may also be linked directly to the secondary bus 304, or included in the secondary node 303.

A secondary bus power supervisor 813 is used to generate other power rails for electronics referring to the secondary bus return 513, to monitor the local power health in the secondary node 303, and to optionally interface with the power source 808 as well as other power-pertinent tasks.

An isolated power converter 811 in the primary node 302 is used to convert the electrical power at one voltage level sourced from one of the primary bus 305 or the secondary bus 304 into electrical power at another level for use on the other bus, and to simultaneously keep the ground isolation between the two buses 304, 305.

Figure 9:
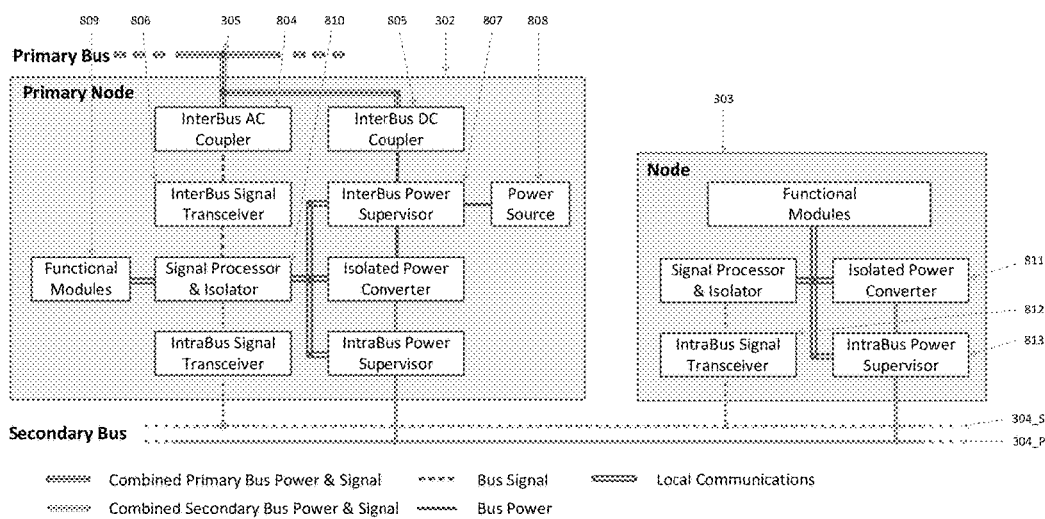
FIG. 9 Illustrates an exemplary schematic diagram of a partial tool bus that shows the main functional blocks of a primary node and a secondary node used in any of the tool buses shown and described in FIGS. 3-6 where the secondary bus has separate communication channels for power and signal suitable for implementing the several embodiments of the disclosure.

FIG. 9 Illustrates an exemplary schematic diagram of a partial tool bus that shows the main functional blocks of a primary node 302 and a secondary node 303 used in any of the tool buses shown and described in FIGS. 3-6 where the secondary bus 304 has separate transmission channels for power and signal suitable for implementing the several embodiments of the disclosure. The functional blocks of the primary node 302 and secondary node 303 are substantially similar to their construction as described above with reference to FIG. 8, and like numerals represent like parts. In the interest of simplicity, the common components shown in primary node 302 and secondary node 303 are not described again, but should be understood in reference to their disclosure in FIG. 8 above.

In contrast to the secondary bus 304 of FIG. 8, the secondary bus 304_S, 304_P of FIG. 9 has separate transmission channels with different electrical paths for communicating bus power and bus signal over the secondary bus. Accordingly, the couplers 814, 815 used in the embodiment of FIG. 8 are not used. Instead, the signal from the secondary bus signal transceiver 812 on the primary node 302 or the secondary node 303 can directly be communicated on the signal transmission line 304_S of the secondary bus 304. Likewise, the power from the power supervisor 813 on the primary node 302 or the secondary node 303 can be directly transmitted on the power transmission line 304_P of the secondary bus 304.

Although the two-layer tool bus systems described above only have one primary node 302 in each of the segments 311, sometimes multiple primary nodes 302 may be used in one segment 311. Each primary node 302 may be linked to their secondary nodes 303 through a separate secondary bus 304 with different communication schemes from the other buses for special needs.

As described above, the SEC 308 at the segment joints 301 creates discontinuity in the communication channels, which cause signal reflection and attenuation. When transmission speeds increase, the effect is made worse. In order to maximize the useable bandwidth, other negative effects should be mitigated as much as possible. Among others, the loading effect from connected nodes proves to be the most significant. One direct reason is the coupling circuit which separates or combines the power and signal. The multi-layered bus structure minimizes the number of nodes directly connected to the primary bus 305 so that high bus speeds can be achieved. For example, the primary bus 305 may operate at speeds of 1 Mbps or greater in a BHA 103 with eight segments and up to sixteen nodes per segment.

Meanwhile, the secondary bus 304 does not have the same discontinuity created by the SEC 308 at the segment joints 301 and also has a shorter communication channel in comparison to the primary bus 305. That is, the secondary bus 304 is fully contained with a given segment 311. Therefore, higher communications speeds or more nodes can be used. For example, the secondary bus 304 may operate at speeds of 10 Mbps or greater with up to sixteen nodes per segment. The combination of advantages afforded by the multi-layered bus architecture provides high bus speeds relative to conventional 100 kbps speeds and a larger number of nodes that can be supported in the BHA 103. Additionally, the multi-layered bus architecture creates isolated communication channels which help to zone in the bus energy and reduce undesirable EM interference, thereby lowering the noise floor.

The traditional industry practice is to use one single wire to transmit the signal and power while relying on the segment metal body as the bus return. As described above, the pending application discloses the use of transmission lines with at least two conductors within a segment 311. One conductor of the transmission line is for bus signal and bus power transmission, the other conductor(s) are for dedicated bus current return. Also, the use of the CM chokes 306 disclosed herein makes the metal body of a segment 311 a detrimental current return path while making a conductor of the transmission line a favourable current return path for the bus return current. Otherwise, substantial current would otherwise flow through the metal body of the segment 311 as it is electrically parallel and provides a potential current return path. Therefore, the pending application manages the return current to flow through the desired path provided by the transmission line. This management of the return current provides two advantages. First, it helps to achieve the expected nominal characteristic impedance of the transmission line, so that maximum bus power can be delivered with minimum distortion and reflection. Second, it helps confine the bus energy in the provided transmission line so that undesirable EM interference to other functional electronics in the BHA 3 is mitigated. Therefore, a higher bus speed and a lower noise floor are achieved.

It is not a simple task to manage the bus return current in practice, especially considering that multiple parallel electrical paths, implicit or explicit, exist mutually in the downhole circumstances. Both the high-performance isolation embodiment described above with reference to FIG. 5 and the easy-implementable AC restrictive embodiment described above with reference to FIG. 6 can meet different application targets.

The primary bus 305 and the secondary bus 304 may employ different communication standards and operate at different speeds. Furthermore, the secondary bus 304 may separately transmit the power and data signal in their own transmission line channels, respectively.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A tool bus system for a bottom hole assembly, comprising:
    a segment of the bottom hole assembly comprising a joint, wherein a single electrical contact (SEC) is provided at the joint and is configured to convey a bus signal across the joint to an adjacent segment of the bottom hole assembly;
    a transmission line with at least two conductors, wherein a first conductor of the transmission line is connected to the SEC and is configured to relay the bus signal, and wherein a second conductor of the transmission line is connected to a body of the segment at a first location at the joint and is configured as a bus return; and
    a common mode choke on the transmission line configured to constrain bus return currents to the transmission line.

2. The tool bus system of claim 1, further comprising:
    a communication component of the tool bus system connected to the transmission line and configured to send or receive the bus signal, wherein the common mode choke is between the communication component and the joint.

3. The tool bus system of claim 2, wherein the transmission line is a primary bus, wherein the communications component is a primary node, wherein the primary node includes a first access port connected to the primary bus and a second access port connected to a secondary bus of the tool bus system.

4. The tool bus system of claim 3, wherein both ends of the secondary bus are terminated within the segment.

5. The tool bus system of claim 3, further comprising:
a secondary node connected to the secondary bus, wherein the secondary node is configured to communicate information and share electrical power with a tool of the bottom hole assembly in the segment.

6. The tool bus system of claim 5, wherein the secondary node comprises local circuitry, wherein a ground of the local circuitry of the secondary node is connected to the body of the segment at a third location.

7. The tool bus system of claim 5, further comprising:
a third common mode choke at the connection between the second access port and the secondary bus of the tool bus system.

8. The tool bus system of claim 7, further comprising:
a fourth common mode choke at the connection between the secondary node and the secondary bus of the tool bus system.

9. The tool bus system of claim 3, wherein the primary bus and the secondary bus communicate at different speeds.

10. The tool bus system of claim 3, wherein the common mode choke is on a leg of the transmission line between the joint and the first access port.

11. The tool bus system of claim 10, further comprising:
a second common mode choke on a second leg of the transmission line between a third access port of the primary node and a second joint of the segment.

12. The tool bus system of claim 3, wherein the common mode choke is integrated within the primary node.

13. The tool bus system of claim 3, wherein the primary node comprises local circuitry, wherein a ground of the local circuitry of the primary node is connected to the body of the segment at a fourth location.

14. The tool bus system of claim 13, where the ground of the local circuitry of the primary node is connected to a conductor of the primary bus configured as a primary bus return and is isolated from a conductor of the secondary bus configured as a secondary bus return.

15. The tool bus system of claim 13, where the ground of the local circuitry of the primary node is connected to a conductor of the primary bus configured as a primary bus return and is connected to a conductor of the secondary bus configured as a secondary bus return.

16. The tool bus system of claim 3, wherein the secondary bus comprises a single transmission line that transmits both secondary bus signal and secondary bus power.

17. The tool bus system of claim 3, wherein the secondary bus comprises two transmission channels that transmits secondary bus signal and secondary bus power separately.

18. The tool bus system of claim 1, further comprising:
a terminator coupled to the transmission line.

19. The tool bus system of claim 1, wherein the segment comprises a second joint, wherein a second SEC is provided at the second joint and configured to convey the bus signal across the second joint to a second adjacent segment of the bottom hole assembly, wherein the first conductor of the transmission line is connected to the second SEC, and wherein the second conductor of the transmission line is connected to the body of the segment at a second location at the second joint.

20. The tool bus system of claim 1, wherein the transmission line has a constant characteristic impedance at a frequency range of interest.

21. The tool bus system of claim 1, wherein the common mode choke is implemented as at least one of a ferrite tube through which the transmission line passes, a ferrite bead on the transmission line, one or more coils of wires on a ferrite core, a bifilar wire wrapped around a magnetic core, or the transmission line passing through or wrapped around a magnetic core.

22. The tool bus system of claim 1, wherein a third conductor of the transmission line is only connected on one end of the third conductor to the body of the segment.

23. The tool bus system of claim 1, where the transmission line is a coaxial cable, twisted wire pair, ladder line, twinax, triax, shielded twisted wire pair, or a multi-axial cable.

* * * * *